METHOD OF MANUFACTURING A MAGNETIC HEAD ASSEMBLY

Filed Nov. 20, 1962 2 Sheets-Sheet 1

Inventor
Kengo Matsumoto by Hill, Sherman, Meroni, Gross & Simpson
Attys

Inventor
Kengo Matsumoto by Hill, Sherman, Meroni, Gross & Simpson
Attys

United States Patent Office 3,302,271

Patented Feb. 7, 1967

3,302,271

METHOD OF MANUFACTURING A MAGNETIC HEAD ASSEMBLY

Kengo Matsumoto, Ohta-ku, Tokyo, Japan, assignor to Sony Corporation, Tokyo, Japan, a corporation of Japan Filed Nov. 20, 1962, Ser. No. 238,848
Claims priority, application Japan, Nov. 22, 1961, 36/42,562
10 Claims. (Cl. 29—155.57)

This invention relates to a method for manufacturing a magnetic head, and particularly to a method of manufacturing a magnetic head for a video tape recorder.

In a magnetic recording and reproducing device, particularly in a magnetic video tape recording and reproducing device, there has been usually employed a composite magnetic head having magnetic pole pieces for defining a working gap which are made of a material having extremely high permeability while the remainder of the magnetic flux path is formed of a material having low loss at high frequencies such as ferrite or similar material for the purpose of reducing the high-frequency loss to as low a value as possible. Especially in a rotary magnetic head of a video tape recording apparatus, the magnetic pole pieces forming the working gap must be highly accurate and extremely small in size, and a material for such pole pieces having high permeability and excellent abrasion resistance such as an iron-silicon-aluminum casting alloy or the like has been used because of the high speed travel of the head relative to the magnetic medium. Such a casting alloy has been described in U.S. Serial No. 208,806, filed July 10, 1962. The magnetic pole pieces are extremely small and hard, so that various technical difficulties are encountered in their practical manufacturing. That is, the nature of the magnetic pole pieces has made it impossible to manufacture the heads by mass-production techniques in the past.

In view of the foregoing, one object of this invention is to provide a novel manufacturing method for magnetic heads which enables one to easily obtain such magnetic heads and to mass produce them.

Another object of this invention is to provide a manufacturing method for magnetic heads adapted for operation at high frequencies and having high sensitivity and excellent abrasion resistance.

A further object of this invention is to provide a manufacturing method for magnetic heads of video tape recorders having a ferrite core and pole pieces formed of an iron-silicon-aluminum casting alloy.

Other objects, features and advantages of this invention will become apparent from the following description taken in conjunction with the accompanying drawing in which:

FIGURES 1 through 4, 4A, 4B and 5 through 10 are diagrams for illustrating one embodiment of the magnetic head manufacturing process according to this invention.

Figures 1, 2, 3, 4, 4A, 4B, 5:
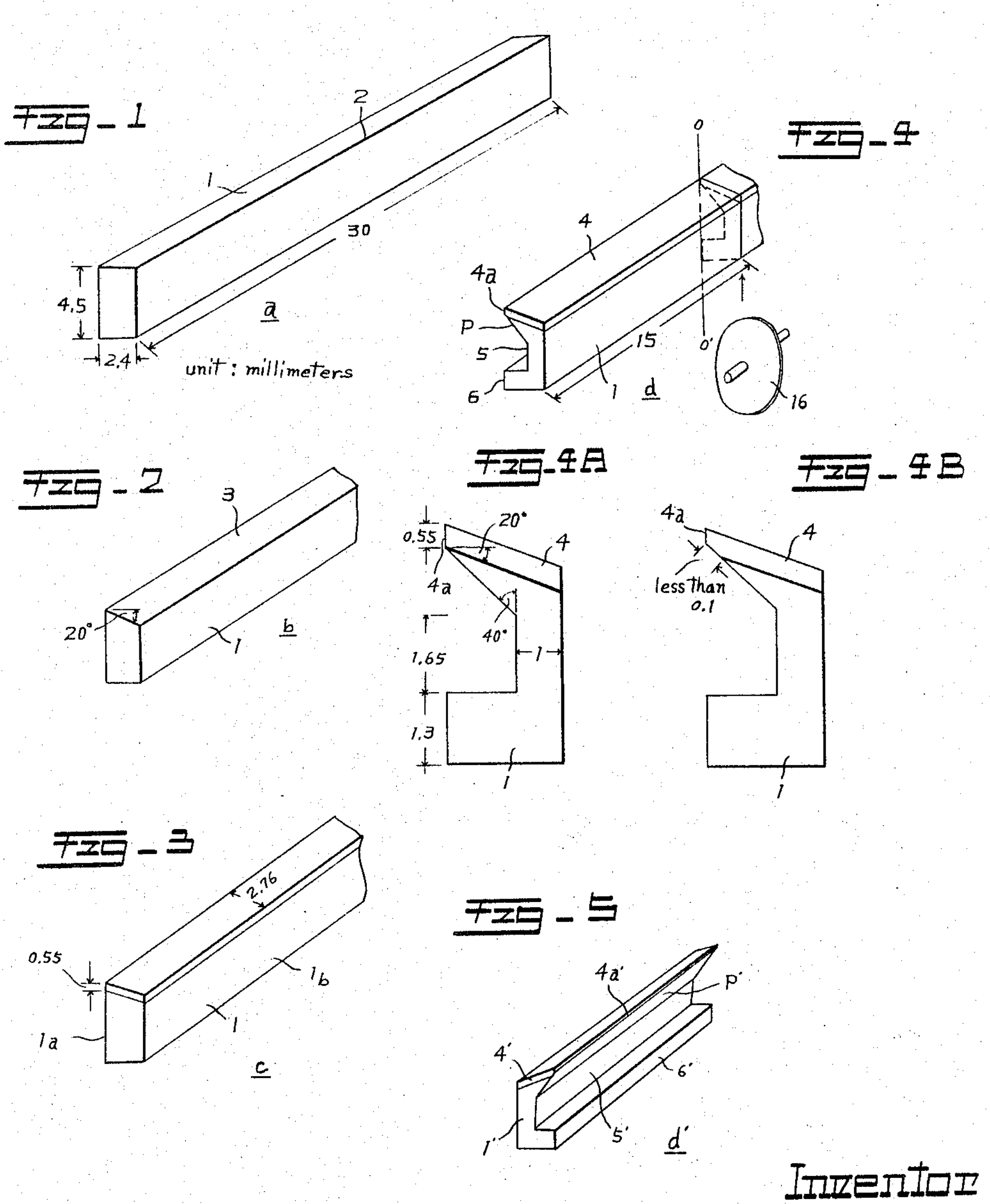
Figure 6:
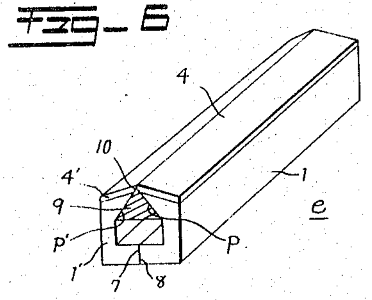

Referring now to the drawings, an example of this invention will hereinafter be explained. At first, a member *a* for forming the main magnetic flux path of a magnetic head is provided. It is a bar of magnetic material 1, for example ferrite or a similar material, and rectangular in cross section (FIGURE 1). The member is long enough, for example about 30 millimeters, to enable many magnetic head elements to be formed therefrom. The magnetic material 1 is crumbled away and ground or polished at one edge 2 over the entire longitudinal extent thereof to provide a magnetic member *b* having a slanting planar face 3 (FIGURE 2). The face 3 is polished to be like a perfect mirror. A sheet of magnetic material 4 to be used for magnetic pole pieces of magnetic heads, for example an iron-aluminum alloy (Alfenol) or an iron-silicon-aluminum casting alloy, is placed upon and rigidly secured to the slanting face 3 by the use of epoxy resin or the like, thereby providing a composite magnetic member *c* (FIGURE 3) including material 4, the thickness of which is about 0.55 millimeter. A central portion of the magnetic material 1 at one side face 1*a* (the height of this face exceeds that of the opposite face 1*b*) is scraped off along its entire longitudinal extent to provide a concave portion 5 where coils are wound later. The scraping-off is carried out as shown in FIGURE 4A or 4B. In any case the magnetic material 1 must be positioned very close to the pole face 4*a* and preferably less than .1 millimeter therefrom. Thus, a half magnetic core member *d* is prepared which is provided with the magnetic pole face 4*a* formed of the magnetic material 4 only and with an opposite end face 6 formed of the magnetic material 1 (FIGURE 4). Another half magnetic core member *d'* is also provided which is similar and forms a symmetrical assembly with the former (FIGURE 5). The symmetrical half core member *d'* can be obtained by dividing the magnetic core member *d* in two at a line O–O'. Its corresponding parts to those of the half magnetic core member *d* are marked with corresponding primed reference numerals and their detailed explanation is the same as for the member *d*. After the magnetic pole faces 4*a*, 4*a'*, and the opposite end faces 6, 6' of the two half magnetic core members *d* and *d'* have been ground and polished, the two half magnetic core members are assembled to obtain a generally tubular magnetic core *e* by placing the magnetic pole faces 4*a*, 4*a'* and the faces 6, 6' in confronting relation with each other (FIGURE 6). The faces 6, 6' are secured together by applying an adhesive material 8, for example, epoxy resin in the gap 7 between the faces 6 and 6'. On the magnetic pole face 4*a* and/or 4*a'* is deposited by evaporation a non-magnetic material which is used as a spacer to define a gap 10. The faces 6 and 6' can be attached with or without an adhesive therebetween. In this invention, a non-magnetic conductive material, for example, copper or eutectic solder forming a conductive body 9 of triangular cross section is interposed between the core members *d* and *d'* at the top of the space therebetween within the magnetic core *e*. By this means magnetic leakage flux $\Phi_1$ (FIGURE 10) can be reduced to a minimum. The triangular conductive body 9 makes contact with faces P and P' and serves to increase the mechanical strength of the resulting magnetic heads.

Figure 9:
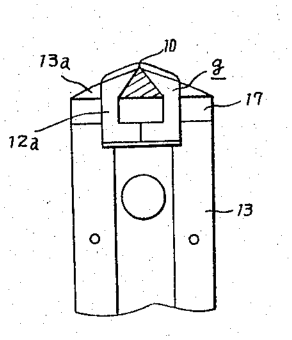
Figure 7:
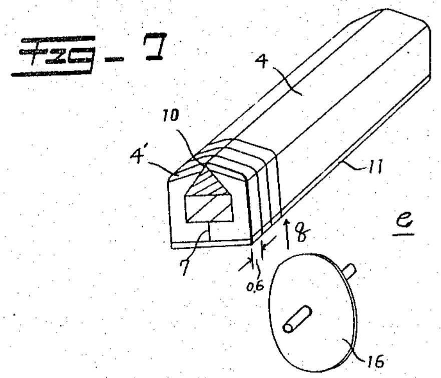
Figure 10:
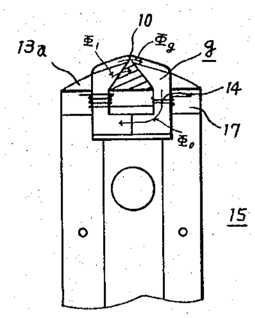
Figure 8:
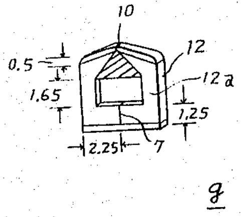

Referring to FIGURE 7, a supporting plate 11 of glass or the like is next connected to the under-face of the magnetic core *e* and the outer surface of the core adjacent the gap 10 is ground and finished to provide a smooth surface for contact with a tape record medium. Thereafter, the magnetic core *e* supported by the supporting plate 11 is cut by a cutter 16 at a right angle to its length dimension into units of a thickness of, for example, 0.6 millimeter or so and ground or polished, thereby providing a plurality of magnetic cores *g*, the number of which is about 24 in this example (FIGURE 8). In this case, as shown in the drawing the magnetic core is cut in the direction of an arrow *q* from its bottom, so as to minimize any influence of the lateral vibration of the cutter 16 on the gap portion 10. This resulting magnetic core is provided with a gap portion adjacent gap 10 composed of the magnetic material 4, 4' and a back gap portion adjacent gap 7 of the magnetic material 1, 1'. The gap 10 forms a working gap for coupling the core to a magnetic medium. Next, the side face 12 of the magnetic core *g* which has been subjected to the cutting action is placed against and secured onto a lateral face 13*a* of a base 13 of non-magnetic material, for example brass, in such a way that the gap portion 10 projects slightly above the top of the base (FIGURE 9). The other side face 12a of the magnetic core g is then ground or polished to be a desired thickness, and a winding 14 is wound around the magnetic core, obtaining a magnetic head assembly 15 (FIGURE 10). The reference numeral 17 designates a grooved portion provided on the base 13 so as to afford room for the winding 14.

The method of this invention has the following features.

(1) There is no need of making in advance each individual pair of magnetic pole pieces with the extremely minute gap being defined by high permeability materials which are very hard and which are difficult to process.

(2) It is also unnecessary to make small-dimensioned cores for each of the magnetic head elements individually.

(3) Means for combining the small magnetic pole pieces referred to in paragraph 1 above with the magnetic core obtained in paragraph 2 above may be omitted.

(4) It is sufficient only to prepare a relatively large sheet of a magnetic material suitable for defining the magnetic gap.

(5) It is also sufficient only to prepare a relatively large magnetic member of the magnetic core material.

(6) The processes in the above paragraphs 4 and 5 are very easy because the magnetic materials are large in size, and hence a desired smooth plane may be obtained.

(7) Such large masses of magnetic material are secured together along a single pair of mating planar faces very simply.

(8) To obtain individual composite magnetic head cores, it is sufficient merely to cut a combined and finished relatively large size magnetic core.

(9) Accordingly, extremely small magnetic head elements can be obtained, which have heretofore never been made, and the accuracy of the magnetic gap can also be increased, so that they are very well adapted to use as magnetic video tape recording and reproducing heads.

(10) Since the magnetic material 4 completely covers the face 3 of the main core material 1, the magnetic flux ($\Phi_0$–$\Phi_1$) which arrives at the face 3 is substantially equal to the working air gap magnetic flux $\Phi_g$ (FIGURE 10), and accordingly very efficient magnetic heads can be obtained.

It will be apparent that many modifications and variations may be effected without departing from the scope of the novel concept of this invention.

What is claimed is:

1. A method of manufacturing a magnetic head assembly with wear resistant working faces comprising grinding a rectangular bar of magnetic material which is elongated in a longitudinal direction to form a planar face along one side thereof, attaching a sheet of magnetic working face material having subtsantially greater abrasion resistance than the magnetic material of said bar to said planar face at said one side of said bar, forming a longitudinal concave portion in an adjacent planar side of said bar to form a generally C-shaped first magnetic core member leaving a front gap surface defined by said adjacent side and said sheet and leaving a back gap surface, combining said first magnetic core member with a second magnetic core member made in the fashion of said C-shaped first magnetic member to form a tubular magnetic core assembly with the respective gap surfaces in confronting relation, cutting said magnetic core assembly at right angles to said longitudinal direction to obtain a plurality of ring-shaped magnetic cores, and providing an electric winding on each of said ring-shaped magnetic cores which extends about the portion of said first magnetic core member associated with said ring-shaped magnetic core.

2. The method of manufacturing a magnetic head assembly in accordance with claim 1 wherein the magnetic core assembly has a first region which is to define magnetic transducing gaps for the plurality of ring-shaped magnetic cores to be formed therefrom and has a second region which is to form back gaps for the plurality of ring-shaped magnetic cores and wherein the cutting of the magnetic core assembly is initiated at the region of the magnetic core assembly which is to define the back gaps of the ring-shaped magnetic cores.

3. A method of manufacturing a magnetic head assembly with wear resistant working surfaces comprising: forming a bar of magnetic material with a trapezoidal cross section including a pair of first and second parallel planar sides, and third and fourth sides, the second side acts as the gap defining surface and has an appreciably greater transverse dimension than the first side and the third side has a planar surface and forms an angle substantially less than 90° with said second side, attaching a sheet of magnetic wear resistant material having substantially greater abrasion resistance than the magnetic material of said bar to said planar surface of said third side to act as working surface material, forming a longitudinal concave portion in said second side and finishing the remaining planar portions of said second side to form a generally C-shaped first magnetic core member, securing said first magnetic core member to a second C-shaped magnetic core member of complementary configuration made in the fashion of said C-shaped first magnetic member to form a tubular magnetic core assembly with the respective finished side surfaces in confronting relation, cutting said magnetic core assembly transversely to obtain a plurality of ring-shaped cores, and providing an electric winding on each of said ring-shaped magnetic cores.

4. The method of manufacturing a magnetic head assembly as defined in claim 3, wherein said sheet of magnetic material is attached to said third side so as to completely cover said third side of said bar.

5. The method of manufacturing a magnetic head assembly as defined in claim 3 wherein each C-shaped magnetic core member has a magnetic pole-forming leg defined by said third side thereof and a plane surface as part of said concave portion forming an acute angle with the planar surface of said third side and converging toward said third side in the direction toward the free end of said leg, and the method further comprising inserting and securing a triangular cross section bar of electrically conductive material into the tubular magnetic head assembly with surfaces of the bar of electrically conductive material engaging the adjacent plane surfaces of said legs prior to cutting of the magnetic head assembly.

6. The method of manufacturing a magnetic head assembly as defined in claim 3 characterized in that the cutting of the magnetic core assembly is initiated at a side thereof away from the side of the magnetic core assembly provided by the third sides of the first and second magnetic core members.

7. The method of manufacturing a magnetic head assembly with wear resistant working surfaces which comprises forming a bar of generally rectangular cross section and of a first magnetic material with a first slanting flat planar face over one entire side thereof, while leaving an adjacent side adjacent said one entire side and an opposite side opposite said one entire side with a right angle relation therebetween, and while leaving a fourth side of the bar with a greater dimension than said adjacent side in the direction between said opposite side and said first face, securing a sheet of a second magnetic wear resistant working surface material having a higher permeability and a higher abrasion resistance than said first magnetic material in overlying relation to the first slanting flat planar face of said one side of said bar with a flat planar surface of the sheet disposed in close confronting parallel relation to said first slanting flat planar face of the bar over the entire area of said one entire side of said bar, forming the fourth side of said bar with a cavity thereby providing a second slanting flat planar face at the region of said bar adjoining said one entire side of said bar with said second slanting flat planar face converging toward said first slanting flat planar face in the direction away from the adjacent side and toward said fourth side of said bar forming a flat planar magnetic pole face on the sheet adjacent to said first and second slanting flat planar faces, assembling a first subassembly comprising the bar and sheet as formed and secured together by the preceding steps with a second subassembly comprising a complementarily formed and secured bar and sheet, with the respective flat planar magnetic pole faces of the first and second subassemblies disposed in closely spaced parallel confronting relation, to form a magnetic core assembly, securing a body of non-magnetic electrically conductive material directly between the respective second slanting flat planar faces of the first and second subassemblies to connect the same, cutting said magnetic core assembly at a right angle to the magnetic pole faces to obtain a plurality of individual magnetic cores, and acting on said magnetic cores to provide individual magnetic head assemblies.

8. The method of claim 7 wherein the cutting of the magnetic core assembly at a right angle to the magnetic pole faces begins at the side of the magnetic core assembly remote from the magnetic pole faces so as to minimize any influence of lateral vibration of the cutter on the closely spaced parallel confronting relation of the respective flat planar magnetic pole faces of the first and second subassemblies.

9. The method of claim 7 wherein one lateral side of an individual magnetic core is placed against a supporting surface of a base of non-magnetic metallic material with a groove in the base aligned with a portion of the magnetic core to provide a winding space completely about the portion of the magnetic core, and winding an electrical conductor about said portion of the core to form an electrical winding linking the magnetic circuit of said core.

10. The method of claim 7 with the step of acting on the magnetic cores to provide individual magnetic head assemblies comprising mounting one lateral side of a magnetic core in overlapping relation to a conforming surface of a base of non-magnetic metallic material, and polishing the opposite lateral face of the magnetic core while the magnetic core is supported by said base to obtain a desired thickness of the magnetic core.

References Cited by the Examiner

UNITED STATES PATENTS 2,380,628 7/1945 Zempel ------------ 29—416 X

FOREIGN PATENTS 776,348 2/1954 Great Britain.
802,481 3/1955 Great Britain.

JOHN F. CAMPBELL, *Primary Examiner*.

WHITMORE A. WILTZ, *Examiner*.

R. W. CHURCH, *Assistant Examiner*.